United States Patent
Lee

(10) Patent No.: US 9,398,395 B2
(45) Date of Patent: Jul. 19, 2016

(54) GROUPING AND DISPLAYING MESSAGES EXCHANGED BETWEEN A SENDER AND MULTIPLE RECIPIENTS

(71) Applicant: KT CORPORATION, Gyeonggi-do (KR)

(72) Inventor: Kee-Young Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 260 days.

(21) Appl. No.: 13/651,357

(22) Filed: Oct. 12, 2012

(65) Prior Publication Data

US 2013/0097260 A1 Apr. 18, 2013

(30) Foreign Application Priority Data

Oct. 12, 2011 (KR) .................. 10-2011-0104090

(51) Int. Cl.
*G06F 15/16* (2006.01)
*H04W 4/00* (2009.01)
*H04W 4/12* (2009.01)

(52) U.S. Cl.
CPC .. *H04W 4/00* (2013.01); *H04W 4/12* (2013.01)

(58) Field of Classification Search
CPC .................................. H04W 4/00; H04W 4/12
USPC ....................................................... 709/206
See application file for complete search history.

(56) References Cited

U.S. PATENT DOCUMENTS

| 6,630,944 | B1 * | 10/2003 | Kakuta | ............... H04L 12/1827 715/758 |
| 2008/0263157 | A1 * | 10/2008 | Bhogal | ................ G06Q 10/107 709/206 |
| 2009/0327972 | A1 * | 12/2009 | McCann | ........... G06F 17/30528 715/853 |
| 2011/0231499 | A1 * | 9/2011 | Stovicek | ........... H04M 1/72547 709/206 |

FOREIGN PATENT DOCUMENTS

| KR | 10-2000-0026145 A | 5/2000 |
| KR | 10-2000-0044508 A | 7/2000 |
| KR | 10-2007-0099824 A | 10/2007 |

* cited by examiner

*Primary Examiner* — Jude Jean Gilles
*Assistant Examiner* — Jaren M Means
(74) *Attorney, Agent, or Firm* — IP Legal Services, LLC

(57) ABSTRACT

The disclosure is related to grouping and displaying messages exchanging between a sender and a plurality of recipients. A first message including a first tag may be sent to a plurality of recipient terminals. A second message may be received from at least one of the recipient terminals. The received second message may be grouped into a related message group based on the first tag and a second tag. The second tag may be included in the second message. The received second messages may be displayed within the related message group.

19 Claims, 13 Drawing Sheets

GROUPING AND DISPLAYING MESSAGES EXCHANGED BETWEEN A SENDER AND MULTIPLE RECIPIENTS

CROSS REFERENCE TO PRIOR APPLICATIONS

The present application claims priority under 35 U.S.C. §119 to Korean Patent Application No. 10-2011-0104090 (filed on Oct. 12, 2011), which is hereby incorporated by reference in its entirety.

FIELD OF THE INVENTION

The present invention relates to communication and, in particular, to providing a graphic user interface that displays messages arranged based on tags included in the messages.

BACKGROUND OF THE INVENTION

Text messages have been popular among users of portable devices, such as a cell phone and a smart phone. Lately, the user of text message increases abruptly while the use of voice calls decreases. The research organization Nielsen reported in 2010 that the total call volume of a mobile phone subscriber was reduced to about 700 minutes per month. Furthermore, a research of the trade association CTIA shows that the average duration of a wireless call has been reduced from about 3 minutes to about 1 minute and 40 seconds since the mid-2007.

Unlike the voice calls, the number of messages used per a month among mobile phone subscribers increases to about 700 messages, according to the Nielsen. This might be resulted from restless thumbs of teenagers. They generally own smart phones, substantially a computer in their hands, and frequently send messages through social networks. Recently, the world's largest social network Facebook stated that a third of 60 million subscribers use Facebook services through their smart phones. As described, a user of a mobile terminal may transmit and receive a large number of messages for communication with other parties in daily life. Since a user exchanges so many messages with multiple parties daily, there is a need for an efficient method of managing messages through a related terminal.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, messages may be grouped and displayed based on tags attached thereto.

In accordance with an embodiment of the present invention, a method may be provided for grouping and displaying messages exchanged between a sender and multiple recipients in a sender terminal. The method may include sending a first message including a first tag to a plurality of recipient terminals, receiving a second message from at least one of the recipient terminals, grouping the received second message into a related message group based on the first tag and a second tag, wherein the second tag is included in the second message, and displaying the received second messages within the related message group.

The sending a first message may include receiving information on a message type and at least one recipient to send the first message through a provided user interface, creating the first tag including information on at least one of a message type, a message identification (ID), and a message recipient based on the received information, receiving a message body from a sender of the sender terminal through a provided user interface, generating the first message by combining the created tag and the received message body, and transmitting the generated first message to the plurality of recipients The grouping the received second message may include extracting the second tag from the received second message, determining a message ID based on a value included in a message ID field, determining a recipient that transmits the second message, and finding the related message group that includes messages exchanged with the sender terminal and the determined recipient based on a message having the determined message ID.

The displaying the received second message may include providing, on a display unit of the sender terminal, a sender side graphic user interface (GUI) for displaying messages exchanged with the plurality of recipient terminals. The sender side GUI is divided into a plurality of sections by each one of the plurality of recipients. The displaying the received second message may include displaying the received second message within a section assigned to the found message group related to the received second message.

The displaying the received second message within a section may include displaying the received second message in connection with the first message having a message ID about identical to the determined message ID of the received second message and displaying the received second message based on a receiving time of the received second message.

The method may further include sending a third message including a third tag in response to the second message to a recipient terminal that sent the second message.

The sending a third message may include creating the third tag having a message ID different from a message ID of the second message.

The message ID of the third tag has at least one of a value increasing from a value of the message ID of the second tag and a value generated by a sequential tag addition scheme.

The method may further include displaying the sent third message in connection with the displayed second message.

The related message group may be one of message groups classified by a recipient.

The second tag may be generated to have a message ID having a value about identical to that of the first tag by a recipient terminal transmitting the second message in response to the first message.

The second tag may be generated by a sequential tag addition scheme based on the first tag of the first message by a recipient terminal transmitting the second message in response the first message.

In accordance with another embodiment of the present invention, a method may be provided for grouping and displaying messages exchanged between a sender and multiple recipients in a recipient terminal. The method may include receiving a first message including a first tag from a sender terminal, sending a second message including a second tag generated based on the first tag in response to the first message when the received first message is a 1:N message based on the extracted first tag, and displaying the sent second message in connection with the first message.

The sending a second message may include extracting the first tag from the received first message, creating the second tag based on the first tag in the first message, receiving a reply message body from a user of the recipient terminal through a provided user interface, and generating a second message as a reply message to the first message by combining the second tag and the reply message body.

The creating the second tag may include creating the second tag to have a message ID having a value about identical to that of the first tag in order to transmit the second message in response to the first message.

The creating the second tag may include creating the second tag by a sequential tag addition scheme based on the first tag of the first message in order to transmit the second message in response to the first message.

The method may further include receiving a third message including a third tag in response to the second message from the sender terminal and displaying the received third message in connection with the second message on the recipient terminal.

In accordance with still another embodiment of the present invention, an apparatus may be provided for grouping and displaying messages exchanged between a sender and multiple recipients. The apparatus may include a sending unit, a receiving unit, and a display unit. The sending unit may be configured to send a first message including a first tag to a plurality of recipient terminals. The receiving unit may be configured to receive a second message from at least one of the recipient terminals in response to the first message. The display unit may be configured to group the received second message into a related message group based on the first tag and a second tag, wherein the second tag is included in the second message.

The receiving unit may be configured to extract the second tag from the received second message. The display unit may be configured to determine a message ID based on a value included in a message ID field, to determine a recipient that transmits the second message, and to find the related message group that includes messages exchanged with the sender terminal and the determined recipient based on a message having the determined message ID.

The display unit may be configured to display a sender side graphic user interface (GUI) for displaying messages exchanged with the plurality of recipient terminals. The sender side GUI may be divided into a plurality of sections by each one of the plurality of recipients. The display unit may display the received second message within a section assigned to the found message group related to the received second message.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
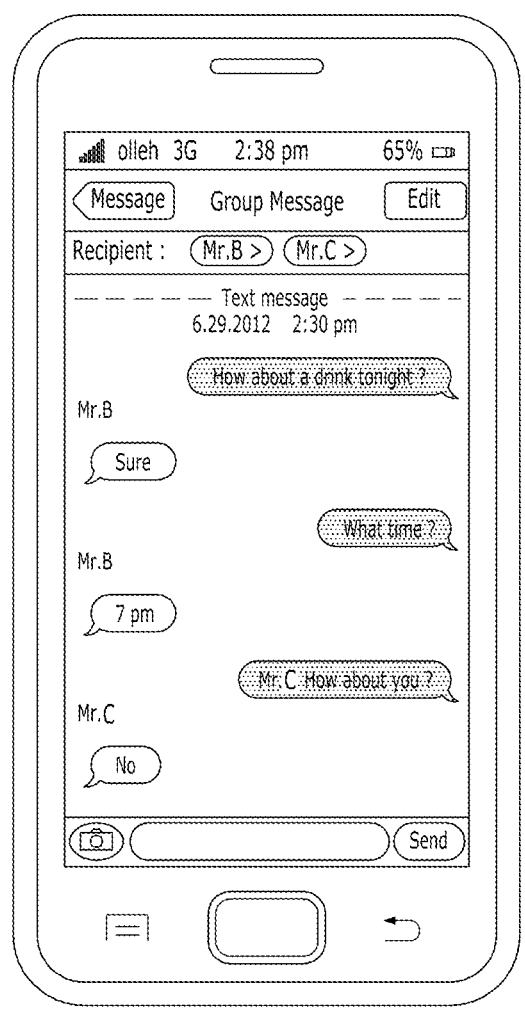
FIG. 1 illustrates a typical user interface (UI) for exchanging text messages with multiple recipients.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a typical user interface (UI) for exchanging text messages with multiple recipients.

Referring to FIG. 1, a mobile terminal such as a smart phone or a cell phone may enable a user to exchange text messages with multiple recipients through a group message and/or a 1:N message. For example, "KakaoTalk" or "WhatsApp" might be well-know applications that enable a user to send a group message and/or a 1:N message. The group message and/or the 1:N message may be a message sent to multiple recipients at the same time. In order to communicate with multiple parties through the group message and/or the 1:N message, a typical user interface (UI) displays messages exchanged between a sender and multiple recipients in time order as shown in FIG. 1. For example, a sender A simultaneously sends a first group message "How about a drink tonight?" to multiple recipients B and C. Then, the recipient B replies with a message "Sure" in response to the first group message. In response to the reply message "Sure", the sender A sends a second message "What time?" only to the recipient B. In response to the second message, the recipient B replies with a message "7 P.M." The sender A also sends a third message "Mr. C, How about you?" only to Mr. C. In response to the third message, Mr. C replies with a message "No" to the sender A.

As show in FIG. 1, the typical group message UI displays the messages exchanged among the sender A and the recipients C and B in time order. Such a typical group message UI reveals all messages sent and received between the sender A and the recipients B and C. For example, the second message "What time?" of the sender A and the reply message "7 PM" of the recipient B are only for communication between the sender A and the recipient B. For another example, the third message "Mr. C How about you?" of the sender A and the reply message "No" of the recipient C are only for communication between the sender A and the recipient C. Such communication may not be required to be revealed to all recipients of a related group message. Furthermore, since a plurality of reply messages among the sender A and the recipients B and C may be arranged and displayed according to sending/receiving times in the typical UI, the readability of messages may be degraded when one of the recipients sends a reply message to a related inquiry message of the sender after the sender exchanges a lot of messages with other recipients related to the related inquiry message of the sender.

Figure 2A:
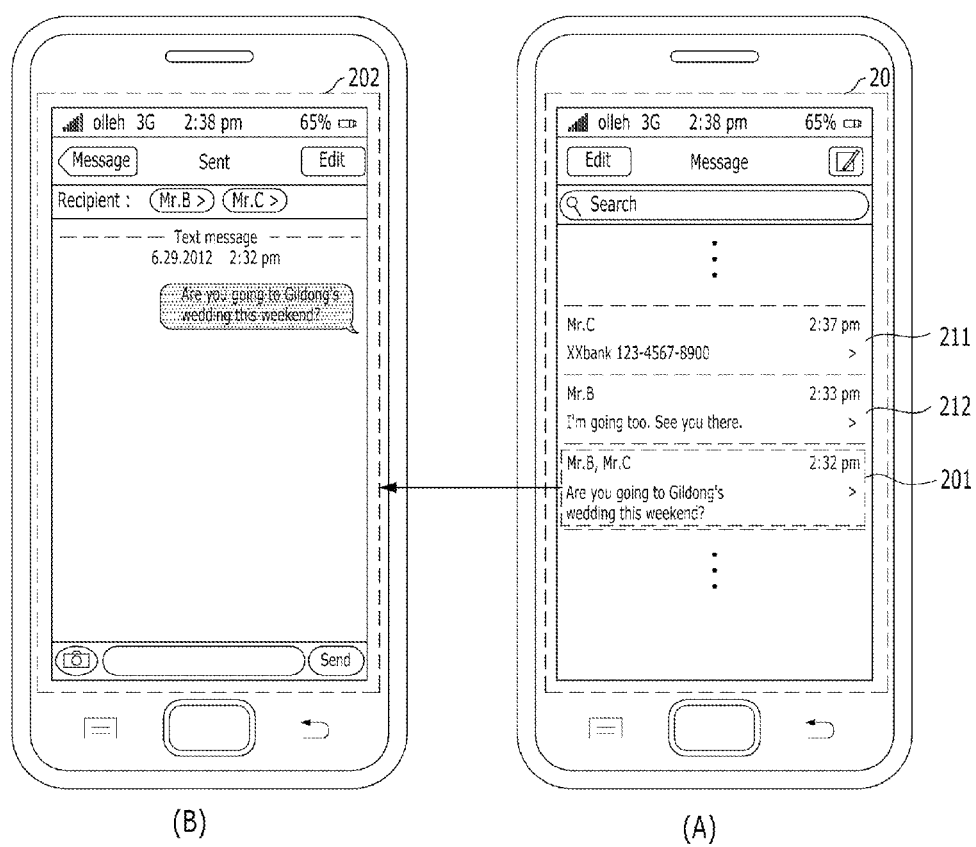
FIGS. 2A and 2B illustrate typical user interfaces (UI) for 1:1 message and 1:N message.
Figure 2B:
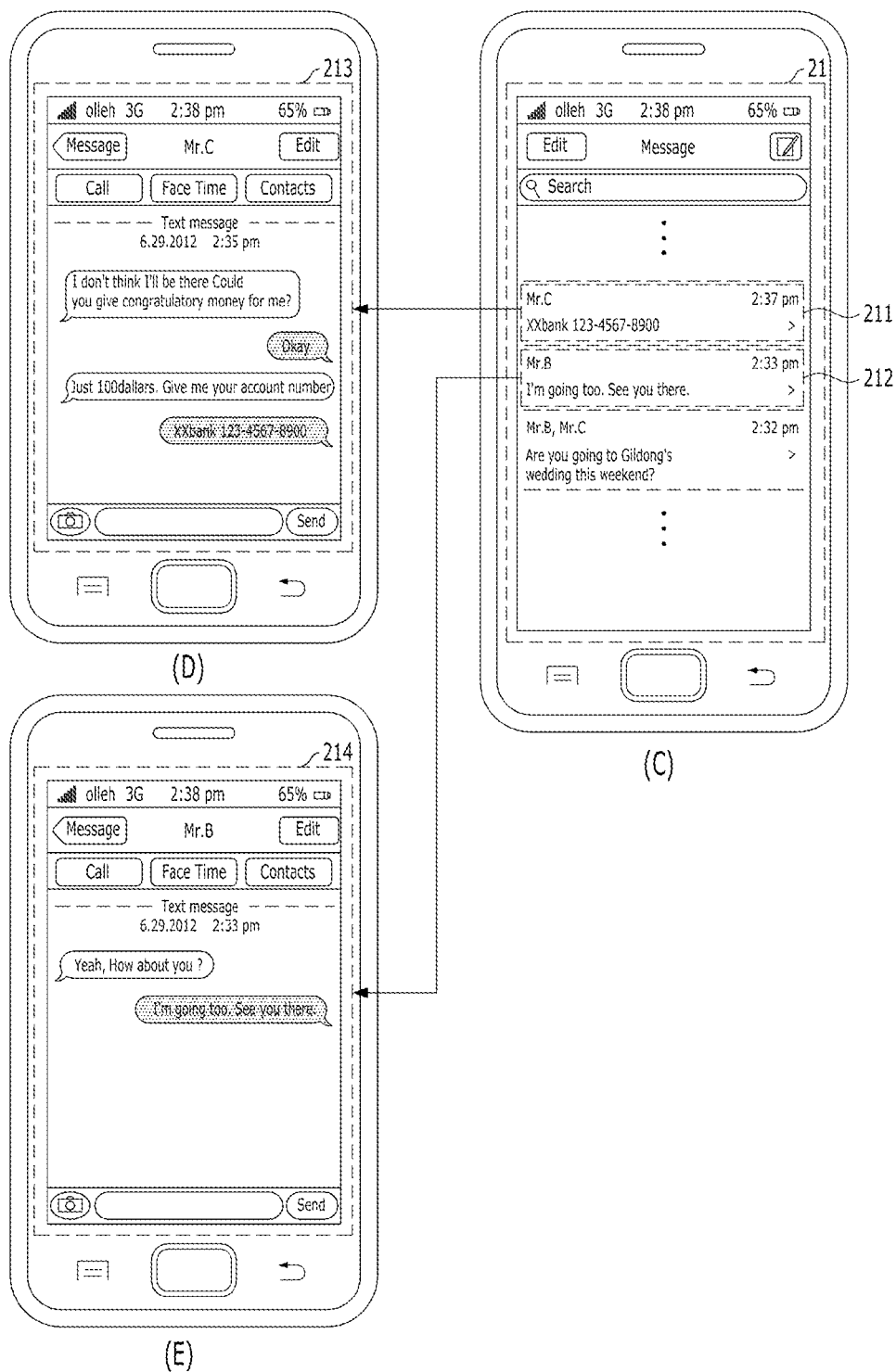

FIGS. 2A and 2B illustrate typical user interfaces (UI) for 1:1 message and 1:N message.

Particularly, FIGS. 2A to 2C shows a typical method for displaying text messages when a sender A sends 1:1 message and/or 1:N messages to a plurality of recipients B and C and receives reply messages from the recipients B and C. Unlike the 1:N message and the group message, the 1:1 message may be a message exchanged between a sender and a single recipient.

FIG. 2A shows a graphic user interface (GUI) of a sender terminal.

Referring to FIG. 2A, a diagram (A) shows GUI 20 that displays message groups exchanged with multiple recipients. For example, block 201 may indicate a 1:N message group exchanged between the sender A and the multiple recipients B and C. Other blocks 211 and 212 of GUI 20 may indicate 1:1 message groups exchanged with a corresponding single recipient, for example, Mr. C or Mr. B.

A diagram (B) shows GUI 202 related to the 1:N message group 201. When a user activates 1:N message group 201, a display unit of the sender terminal may display GUI 202 in order to show messages exchanged between the sender A and the multiple recipients B and C. Similar to FIG. 1, GUI 202 may display all messages exchanged with multiple recipients B and C in time order. Accordingly, messages from different recipients B and C might be revealed to all recipients invited in related 1:N message group 201. Furthermore, since the messages are displayed in time order, the readability of the messages may be degraded.

FIG. 2B shows GUIs related to 1:1 messages.

Referring to FIG. 2B, a diagram (C) shows 1:1 message groups 211 and 212, each of which exchanges messages with single recipient B or C. For example, 1:1 message group 211 may denote a message group exchanged with single recipient Mr. C and 1:1 message group 212 may denote a message group exchange with single recipient Mr. B. When a user activates one of 1:1 message groups 211 and 212, corresponding GUI displaying related messages is displayed as shown in diagrams (D) and (E) of FIG. 2B.

For example, when a user activates message group 211 as shown in the diagram (C) of FIG. 2B, related GUI 213 may be displayed on a related mobile terminal as shown in the diagram (D) of FIG. 2B. Message group 211 may be a group of messages exchanged with a single recipient, Mr. C. GUI 213 may display message exchanged with the sender A and the single recipient Mr. C in time order. For another example, when a user activate message group 212 as shown in the diagram (C) of FIG. 2B, related GUI 214 may be displayed on a related mobile terminal as shown in the diagram (E) of FIG. 2B. Message group 212 may be a group of messages exchanged with a single recipient, Mr. B. GUI 214 may display messages exchanged with the sender A and the single recipient Mr. B in time order. As shown in FIG. 2, messages exchanged with difference recipients B and C are not revealed through 1:1 message. A user, however, may not see messages from the recipients B and C at the same time, that is, in one GUI. Such a way of checking messages related to one inquiry message might be annoying because a user must close a current GUI related to one recipient and open another GUI related to another recipient for reading messages from multiple recipients.

In order to overcome such disadvantages of a typical user interface for displaying messages exchanged between a sender and multiple recipients, messages may be grouped by each recipient and by an inquiry message sent from a sender based on a tag attached a corresponding message in accordance with at least one embodiment of the present invention. Herein, a message may be an electronic message. Such message may include a text message, an audio message, an image message, a video message, a multimedia message, a Short Message Services (SMS) message, a Multimedia Messaging Services (MMS) message, an instant message, an instant messenger message, an email message, a mobile message, an internet-based message, and a wireless internet based message. Hereinafter, a method and an apparatus for grouping and displaying messages based on tags included in messages in accordance with at least one embodiment of the present invention will be described with reference to FIG. 3 to FIG. 10.

Figure 3:
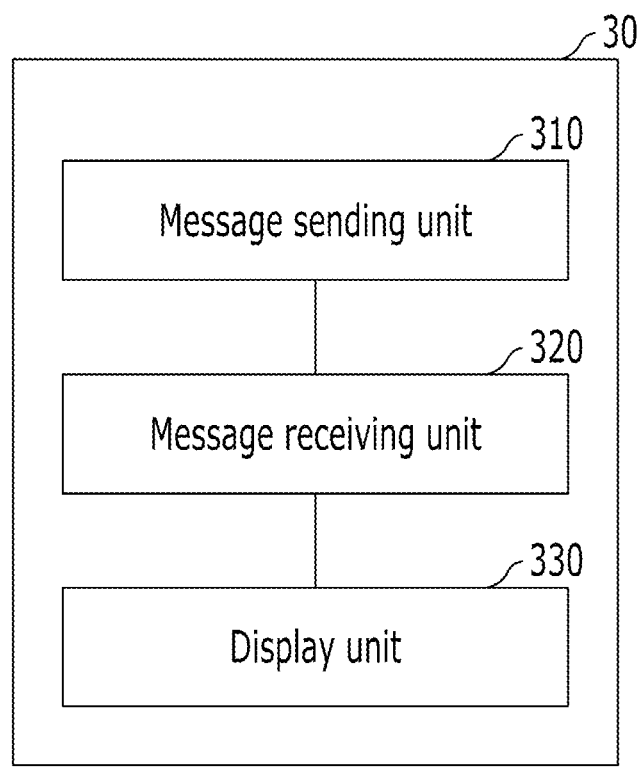
FIG. 3 illustrates an apparatus for grouping and displaying messages based on attached tags in accordance with at least one embodiment of the present invention.

FIG. 3 illustrates an apparatus for grouping and displaying messages based on attached tags in accordance with at least one embodiment of the present invention.

As illustrated in FIG. 3, apparatus 30 may group and display messages exchanged between a sender and multiple recipients in accordance with embodiments of the present invention. Apparatus may be referred to as a messaging apparatus. Messaging apparatus 30 may include message sending unit 310, message receiving unit 320, and display unit 330 in accordance with embodiments of the present invention. Messaging apparatus 30 may be included in a user terminal. The user terminal may be a device capable of communicating with other communication devices, accessing the Internet, and/or receiving various types of information from the Internet. For example, the user terminal may be a wideband CDMA (WCDMA) phone, a smart phone, a personal digital assistant (PDA), a computer device, a notebook computer, a net-book computer, and/or an e-book.

Before sending a 1:N message to a plurality of recipient terminals, message sending unit 310 may receive a user input for initiating a 1:N messaging application, a user input for selecting N recipients, and a message body to be sent to the N selected recipients from a sender, in interworking with display unit 330 which provides a user interface (UI) for receiving user inputs.

Message sending unit 310 may generate a tag that indicates a message type, a message identifier (ID), and a recipient. For example, a tag may include a message type field, a message identifier (ID) field, and a recipient ID field. The message type field may indicate a type of a message, such as a 1:N message or a typical 1:1 message. The message ID field may indicate identification of a message created by the sender. The recipient ID field may indicate a recipient of a related message. The tag will be described in more detail with reference to FIGS. 7A and 7B. Message sending unit 310 may create a 1:N message with the generated tag attached and send the created message to the selected N recipients.

When message sending unit 310 sends the created 1:N message, display unit 330 may display a sender side 1:N message graphic user interface (GUI) including a plurality of sections divided according to the N recipients. Herein, the 1:N message GUI may include a plurality of sections divided by recipients who a message is sent to. When a reply message is received from the recipients in response to the 1:N message, the received reply message is displayed within a corresponding section associated with a recipient who transmits the reply message.

In some embodiments according to the present invention, message receiving unit 320 may receive a 1:N message with a tag attached from another sender terminal. In this case, message receiving unit 320 may extract a tag from the received 1:N message. Message receiving unit 320 may determine a type of the received message based on a message type field included in the extracted tag. When it is determined that the type of message is a 1:N message, message receiving unit 320 detects a message ID based on the extracted tag. When it is determined that the type of message is not the 1:N message (e.g., a typical 1:1 message), message receiving unit 320 may handle the received message in a typical method. That is, the recipient terminal may send a reply message using a typical message transmission technique.

When message receiving unit 320 detects a message ID based on the extracted tag, display unit 330 may display a receiver side 1:N messaging graphic user interface (GUI). The receiver side 1:N messaging graphic user interface (GUI) may display messages sent/received only between corresponding participants (i.e., a recipient and a corresponding sender).

Message sending unit 310 may receive a reply message body from a user in interworking with display unit 330 which provides a user interface (UI). Message sending unit 310 may generate a tag (i.e., a tag to be inserted in a reply message) by using the detected message ID of the received message (i.e., the message ID detected by the message receiving unit 320) as a message ID of a reply message. For example, message sending unit 30 may generate the message ID of the reply message identical to the message ID of the received message in accordance with embodiments of the present invention. Accordingly, reply messages transmitted from a recipient may have the same message ID as compared to a related inquiry message transmitted from a sender in accordance with embodiments of the present invention. When messages are grouped, messages having the same message ID may be grouped together. Furthermore, the generated tag of the reply message may include a reply message ID field that indicates an order of reply messages created by the user (corresponding to a recipient) to reply to a received message (i.e., inquiry message) from the corresponding sender. When a recipient sends multiple reply messages to one specific inquiry message from the corresponding sender, the reply message ID field may have a value increasing according to the number of associated reply messages created. Such format of messages and tagging schemes will be described in more detail with reference to FIGS. 7A and 7B. Message sending unit 310 may create a reply message with the generated tag attached and transmit the created reply message to only a corresponding sender terminal using 1:1 message transmission technique. Such reply message is not transmitted to multiple users, but only to the corresponding sender in accordance with embodiments of the present invention.

After sending a 1:N message to a plurality of recipient terminals, messaging receiving unit 320 may receive a reply message with a tag attached from at least one of the recipient terminals. Messaging receiving unit 320 may extract the attached tag from the received message.

Messaging receiving unit 320 may determine a type of the received message based on a message type field included in the extracted tag. That is, the messaging receiving unit 320 may determine, based on a message type field included in the extracted tag, whether a type of the received message is a typical message or a reply message to a 1:N message previously transmitted from the sender terminal. When it is determined that the type of message is a 1:N message, messaging receiving unit 320 may detect a message ID included in the message ID field of the tag attached to the received message. When it is determined that the type of the received message is not the 1:N message, messaging receiving unit 320 handles the received message in a typical method. That is, when the type of the received message is a typical message, the received message may be handled in a typical method. Also, messaging receiving unit 320 may detect a recipient ID included in the recipient ID field of the tag attached to the received message.

Display unit 330 may display the received reply message under a previously transmitted message having the same message ID of the received reply message within a section associated with a recipient ID. Furthermore, when there are multiple reply messages having the same message ID of the previously transmitted message and from the same recipient, the received reply messages may be displayed in an order based on a value included in a reply message ID field under the associated previously transmitted message within the associated section.

Meanwhile, message sending unit 310 of the sender terminal may receive a reply message body to be sent to the recipient associated with the received reply message from the sender through the provided UI. Message sending unit 310 of the sender terminal may generate a tag different from the tag attached to the previously transmitted message. For example, a value of a message ID field may be different from that of the previously transmitted message. Particularly, the value of the message ID field may increase by 1 every time message sending unit 310 creates a new message. Such format of a message and tagging scheme will be described in detail with reference to FIGS. 7A and 7B.

After creating the tag, message sending unit 310 may create a message with the created tag attached and send the created message only to the associated recipient. This message might be a reply message to the reply message from the associated recipient. After sending the new message, display unit 330 may display the newly sent message under the received reply message within the section associated with the recipient. Hereinafter, a method for grouping and displaying 1:N messages in accordance with embodiments of the present invention will be described with reference to FIG. 4 to FIG. 6.

Figure 4:
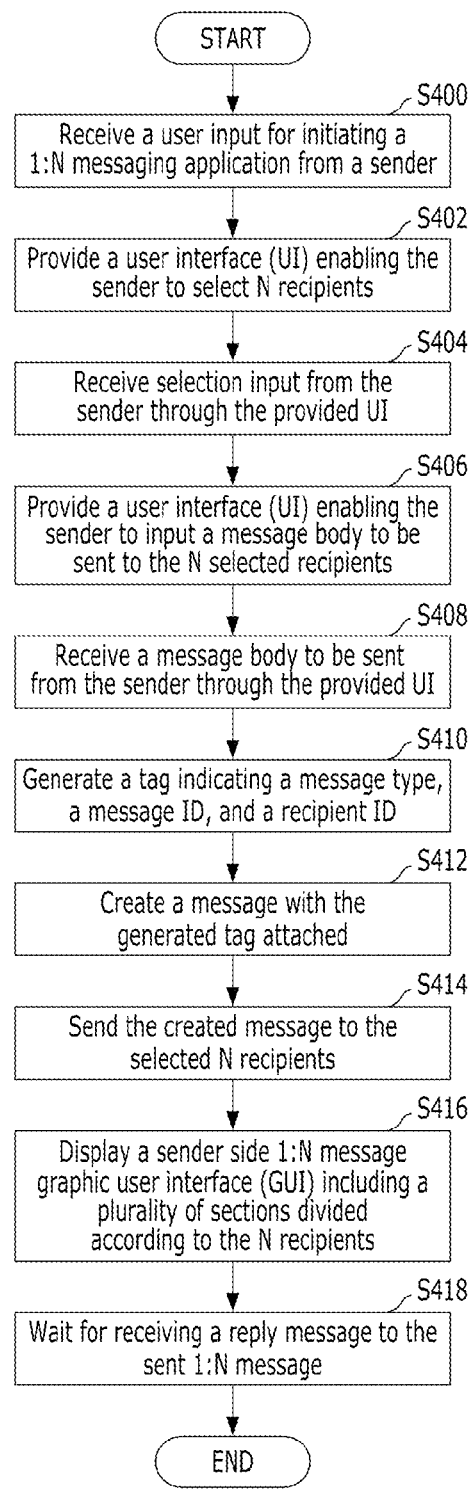
FIG. 4 illustrates a method for sending a 1:N message including a tag in a sender terminal in accordance with at least one embodiment of the present invention.

FIG. 4 illustrates a method for sending a 1:N message including a tag in a sender terminal in accordance with at least one embodiment of the present invention.

Referring to FIG. 4, a user input may be received for initiating a 1:N messaging application installed in a sender terminal at step S400. For example, the sender terminal may receive a user input for initiating a 1:N messaging application from a sender. The 1:N messaging application may enable a user to send a message to multiple recipients. Such 1:N messaging application may be downloaded from a related server and installed on a terminal. After installing, the 1:N messaging application may be displayed as an icon within a default graphic user interface of the sender terminal. By clicking the icon of the 1:N messaging application, the 1:N messaging application may be initiated. The present invention, however, is not limited thereto. A sender might select the 1:N messaging application from a menu bar of the sender terminal. Upon the initiation of the 1:N messaging application, the sender terminal may perform a procedure for selecting N recipients, creating a tag, and sending a 1:N message with the tag attached. Such procedure may be performed when the sender merely selects or inputs a plurality of recipients in a new message mode without selecting the 1:N messaging menu.

At step S402, the sender terminal may provide a user interface (UI) enabling the sender to select N recipients. For example, the graphic user interface of the 1:N messaging application may provide information stored in the sender terminal in order to enable a user to select N recipients. The provided information may be a list of telephone numbers from a contact list stored in the sender terminal.

At step S404, the sender terminal may receive recipient selection input from the sender through the provided UI. For example, the recipient selection input may include information on recipients selected by the sender. The sender may select a plurality of recipients using contact information or an address book stored in the sender terminal. Also, the sender may input recipient identifier (ID) information such as a telephone number, a user identifier, and an email address.

At step S406, the sender terminal may provide a user interface (UI) enabling the sender to enter texts as a message body to be sent to the N selected recipients.

At step S408, the sender terminal may receive a message body through the provided UI. For example, the sender might enter texts into the provided UI in order to send a message to the N selected recipients. For example, the sender may enter "Are you going to Gildong's wedding this weekend?" through the provided UI.

At step S410, the sender terminal may generate a tag indicating a message type, a message ID, and a recipient. For example, a tag includes a message type field, a message ID field, and a recipient ID field. The message type field indicates a type of a message, such as a 1:N message or a typical 1:1 message. The message ID field indicates identification of a message created by the sender. The recipient ID field indicates a recipient ID of a related message. The tag format and the tagging scheme will be described in detail with reference to FIGS. 7A and 7B.

At step S412, the sender terminal may create a message with the generated tag attached and the received message body. At step S414, the sender terminal may send the created message to the selected N recipients. For example, the sender terminal may simultaneously transmit the same message to the selected N recipients.

At step S416, the sender terminal may display a sender side 1:N message graphic user interface (GUI) including a plurality of sections divided according to the N recipients. Herein, the 1:N message GUI may include a plurality of sections divided by recipients who a message is sent to. When a reply message is received from the recipients in response to the 1:N message, the received reply message is displayed within a corresponding section associated with a recipient who transmits the reply message.

At step S418, the sender terminal may wait for receiving a reply message to the sent 1:N message from at least one of the recipients. When the sender receives the reply message to the sent 1:N message, a method of FIG. 6 may be performed in the sender terminal.

Figure 5:
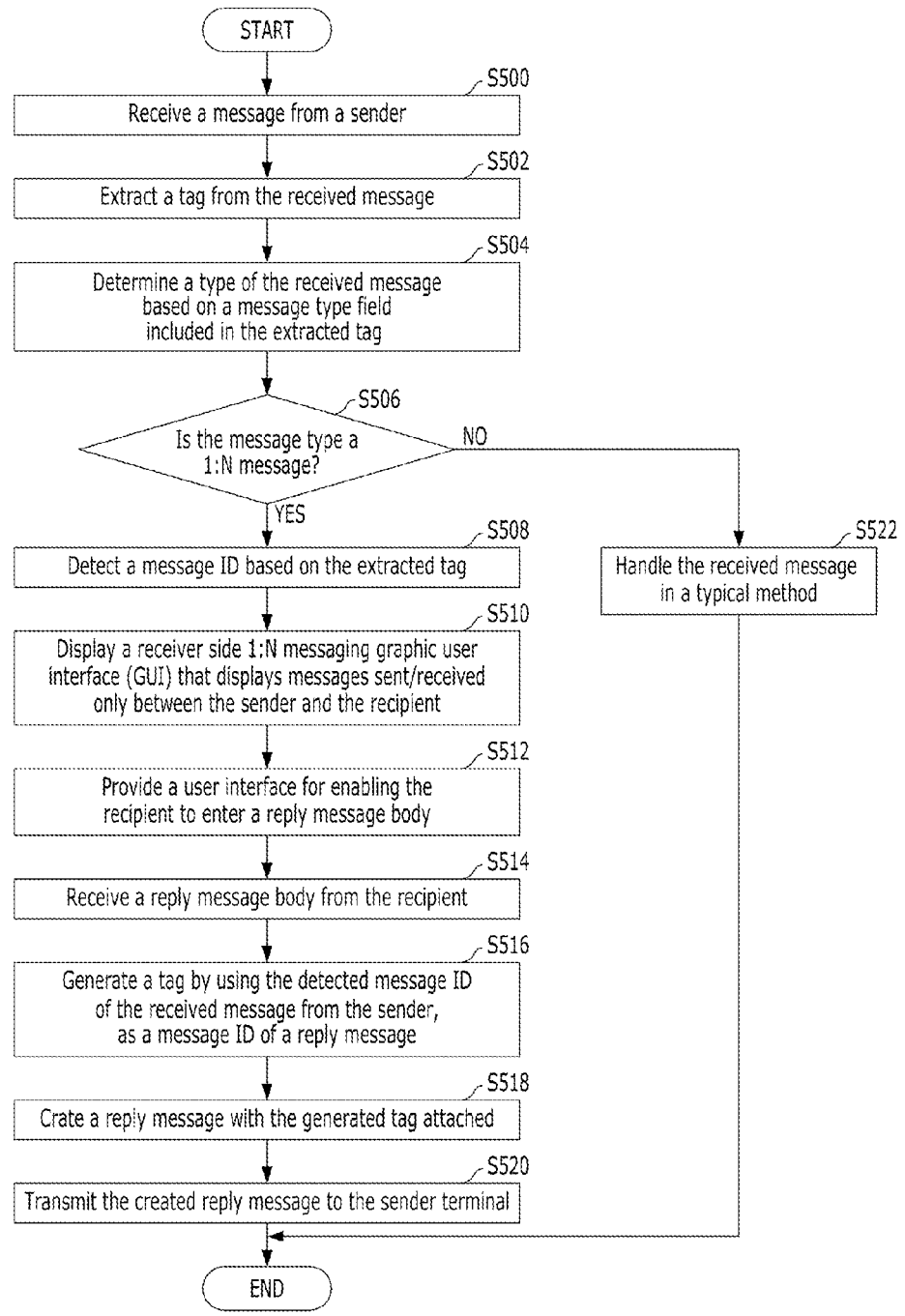
FIG. 5 illustrates a method for receiving a 1:N message with a tag attached and replying to the 1:N message in a recipient terminal in accordance with at least one embodiment of the present invention.

FIG. 5 illustrates a method for receiving a 1:N message with a tag attached and replying to the 1:N message in a recipient terminal in accordance with at least one embodiment of the present invention.

Referring to FIG. 5, a recipient terminal may receive a message from a sender at step S500. Upon the receipt of the message, the recipient terminal may extract a tag from the received message at step S502.

At step S504, the recipient terminal may determine a type of the received message based on a message type field included in the extracted tag.

When it is determined that the type of message is not the 1:N message (e.g., a typical 1:1 message) (No—S506), the recipient terminal handles the received message in a typical method. That is, the recipient terminal may send a reply message using a typical message transmission technique at Step S522. Herein, the typical reply message does not include a tag which is described in embodiments of the present invention.

When it is determined that the type of message is a 1:N message (Yes—S506), the recipient terminal detects a message ID based on the extracted tag at step S508. At step S510, the recipient terminal may display a receiver side 1:N messaging graphic user interface (GUI) that displays messages sent/received only between the sender and the recipient. At step S512, the recipient terminal may provide a user interface for enabling the recipient to enter a reply message body. At step S514, the recipient terminal may receive a reply message body from the recipient.

At step S516, the recipient terminal may generate a tag for a reply message using the detected message ID of the received message. For example, the generated tag may be attached to the reply message. The generated tag may have the same message ID of the received message. Furthermore, the generated tag of the reply message may include a reply message ID field that indicates an order of reply messages created by the user (corresponding to a recipient) to reply to a received message (i.e., inquiry message) from the corresponding sender. When a recipient sends multiple reply messages to one specific inquiry message from the corresponding sender, the reply message ID field may have a value increasing according to the number of associated reply messages created.

At step S518, the recipient terminal may create a reply message with the generated tag attached and the received reply message body. At step S520, the recipient terminal may transmit the created reply message to the sender terminal. Thereafter, the recipient terminal may display the transmitted reply message in connection with the received message. That is, the recipient terminal may display the transmitted reply message under the received message displayed at step S510. Unlike a typical group message transmission technique, the recipient terminal may send the reply message of the 1:N message only to the sender excluding other recipients of the 1:N message transmitted from the sender. In addition, the reply message is only displayed to the sender and the recipient that transmit the reply message. That is, a reply message of one recipient may be hided from other recipients of a related 1:N message in accordance with embodiments of the present invention. Accordingly, reply messages to a 1:N message between the sender terminal and each of the recipients may be processed based on 1:1 message transmission technique after receiving the 1:N message from the sender terminal.

Figure 6:
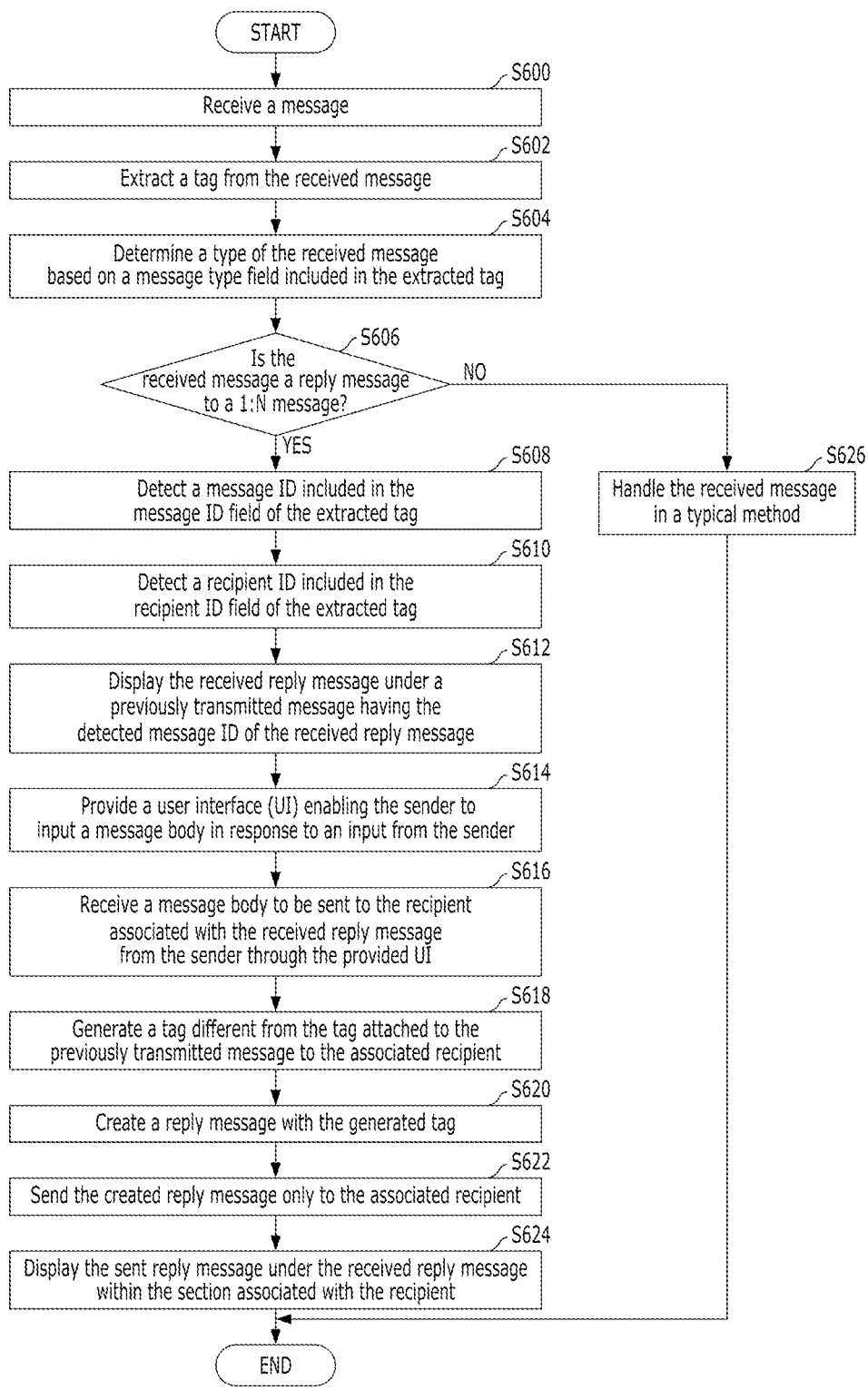
FIG. 6 illustrates a method for receiving a reply message with a tag attached and replying to the reply message in a sender terminal in accordance with at least one embodiment of the present invention.

FIG. 6 illustrates a method for receiving a reply message with a tag attached and replying to the reply message in a sender terminal in accordance with at least one embodiment of the present invention.

Referring to FIG. 6, the sender terminal receives a message from at least one of the recipients at step S600. Upon the receipt of the message, the sender terminal extracts a tag from the received message at step S602.

At step S604, the sender terminal may determine a type of the received message based on a message type field included in the extracted tag. That is, the sender terminal may determine, based on a message type field included in the extracted tag, whether a type of the received message is a typical message or a reply message to a 1:N message previously transmitted from the sender terminal.

When it is determined that the type of the received message is not the 1:N message (No—S606), the sender terminal handles the received message in a typical method at step S626. For example, when the type of the received message is a typical message, the received message may be displayed in a typical message handling method.

When it is determined that the type of message is a 1:N message (Yes—S606), the sender terminal detects a message ID included in the message ID field of the tag attached to the received message at step S608.

At step S610, the sender terminal may detect a recipient ID included in the recipient ID field of the tag attached to the received message. At step S612, the sender terminal may display the received reply message under a previously transmitted message having the detected message ID of the received reply message within a section associated with the detected recipient ID. That is, the sender terminal may determine that the received reply message is a reply message to a previously sent message with an identical message ID. Accordingly, the sender terminal may display the received reply message in connection with a previously transmitted message having the detected message ID of the received reply message. For example, the received reply message may be displayed in an order based on a value included in a reply message ID field under the associated previously transmitted message within the associated section.

At step S614, the sender terminal may provide a user interface (UI) enabling the sender to input a reply message body in response to an input from the sender. At step S616, the sender terminal may receive the reply message body to be sent to the recipient associated with the received reply message from the sender through the provided UI.

At step S618, the sender terminal may generate a tag different from the tag attached to the previously transmitted message to the associated sender. For example, a value of a message ID field may be different from that of the previously transmitted message. Particularly, the value of the message ID field may increase by 1. The tag format and the tagging scheme will be described in detail with reference to FIGS. 7A and 7B.

At step S620, the sender terminal may create a reply message (i.e., a re-reply message) with the created tag attached. At step S622, the sender terminal may send the created message only to the associated recipient.

At step S624, the sender terminal may display the sent reply message under the received reply message within the section associated with the recipient. That is, the sender terminal may display the sent reply message in connection with the received message which displayed at step S612.

As described above, the sender may read all messages exchanged with the selected N recipients of the 1:N message, which are grouped and displayed by an inquiry message transmitted from the sender and by each recipients. Accordingly, the readability of the message is improved. Furthermore, one recipient is not enabled to see messages exchanged between the sender and the other recipients in accordance with embodiments of the present invention. Accordingly, privacy and security may be guaranteed among multiple recipients in accordance with embodiments of the present invention.

Figure 7A:
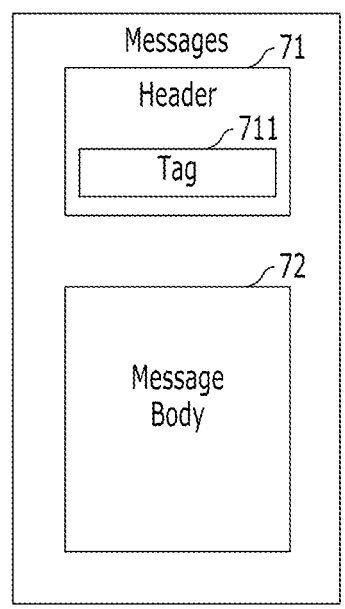
FIGS. 7A and 7B illustrate a tag included in a message in accordance with at least one embodiment of the present invention.
Figure 7B:
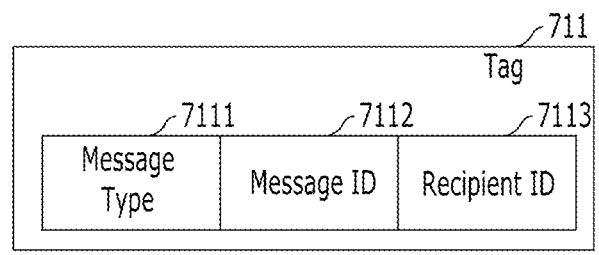

FIGS. 7A and 7B illustrate a tag included in a message in accordance with at least one embodiment of the present invention.

Referring to FIG. 7A, message 70 exchanged between a sender and each of the recipients may include header 71 and message body 72. A tag may be inserted in a predetermined location of a message. As illustrated in FIG. 7A, tag 711 may be inserted in an unspecified location of header 71 or a predetermined location of header 71.

Referring to FIG. 7B, tag 711 in accordance with at least one embodiment of the present invention may indicate a message type, a message ID, and/or a recipient. For example, a tag may include message type field 7111, message ID field 7112, and/or recipient ID field 7113. Message type field 7111 may indicate a type of a message, such as a 1:N message or a typical 1:1 message. Message ID field 7112 may indicate identification of a message created by a sender or a recipient. Recipient ID field 7113 may indicate a recipient of a related message. Therefore, recipient ID field 7113 may include a recipient ID.

Messages with a tag attached may include: (1) a 1:N message (hereinafter, a first message), which a sender terminal sends to a plurality of recipients, (2) a reply message (hereinafter, a second message), which is transmitted to the sender terminal by at least one of the plurality of recipients in response to the first message, and (3) a reply message (hereinafter, a third message), which the sender terminal sends to the respective recipients in response to the second message. The first message, the second message, and the third message may include a first tag, a second tag, and a third tag, respectively. The first tag, the second tag, and the third tag may include a first message ID, a second message ID, and a third message ID, respectively.

In accordance with embodiments of the present invention, the second message ID may be the same as the first message ID. That is, when the second message is a reply message to the 1:N message which is the first message, the second message ID may be identical to the first message ID. The third message ID may be different from the first message ID and the second message ID. In some embodiments of the present invention, the third message ID may be the same as the second message ID such that messages having the same message ID may be grouped into the same message group together.

In another embodiment of the present invention, the second message ID (e.g., "11") may be generated by adding a tag value to the first message ID (e.g., "1"). The third message ID (e.g., "111") may be generated by adding a tag value to the second message ID (e.g., "11"). When a tag includes identification information which indicates a message type and a message ID, Table 1 below shows an exemplary tagging scheme such as a sequential tag addition scheme in accordance with embodiments of the present invention. The recipient identifier (ID) information may include a telephone number, a user identifier, and/or an email address. The size of the first tag, the second tag, and/or the third tag may be determined based on the number of recipients.

When a sender terminal A sends a 1:N message (Message No. 1) with a tag "e1" to a plurality of recipients B and C, each of the recipients B and C may determine whether a received message is a 1:N message based on a tag value "e". The respective recipients B and C may transmit a reply message with a tag "e11" attached. The sender may identify that the received reply message (Message No. 2) is a reply message to the sent 1:N message (Message No. 1) based on the attached tag "e11". Accordingly, the sender terminal may display the sent 1:N message (Message No. 1) and the received reply message (Message No. 2) together on a same display screen. Herein, the sender terminal may identify message Nos., and arrange and display sent/received messages by recipient according to the identified message Nos. For example, in the sender (A) terminal, the received message (Message No. 2) with a tag ("e11") from the recipient B may be displayed in connection with the 1:N message (Message No. 1) ("e1") which has the most similar tag. Meanwhile, when a sender (A) terminal sends another new 1:N message to a plurality of recipients B and C at the same time, the new message may include a different tag value (e.g., "e2").

TABLE 1

| Message No. | Recipient ID | Message type Tag | 1st Tag | 2nd Tag | 3rd Tag | 4th Tag | 5th Tag | Tag |
|---|---|---|---|---|---|---|---|---|
| 1 | (To) B | e | 1 | | | | | e1 |
| 1 | (To) C | e | 1 | | | | | e1 |
| 2 | (From) B | e | 1 | 1 | | | | e11 |
| 3 | (To) B | e | 1 | 1 | 1 | | | e111 |
| 4 | (From) C | e | 1 | 1 | | | | e11 |
| 5 | (To) C | e | 1 | 1 | 1 | | | e111 |
| 6 | (From) C | e | 1 | 1 | 1 | 1 | | e1111 |
| 7 | (To) C | e | 1 | 1 | 1 | 1 | 1 | e11111 |

In another embodiment of the present invention, the first, second and third message IDs may have the same value when the 1:N message, the recipient reply message, and the sender reply message are associated with an identical message subject (i.e., an identical event).

Figure 8A:
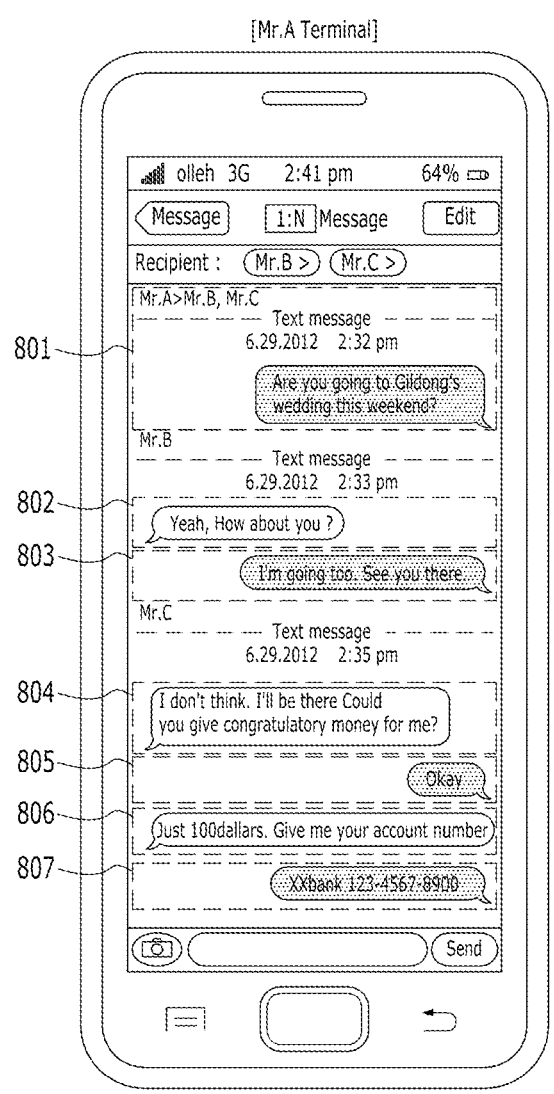
FIGS. 8A to 8C illustrate an exemplary user interface (UI) displaying 1:N messages in a user terminal in accordance with at least one embodiment of the present invention.
Figure 8B:
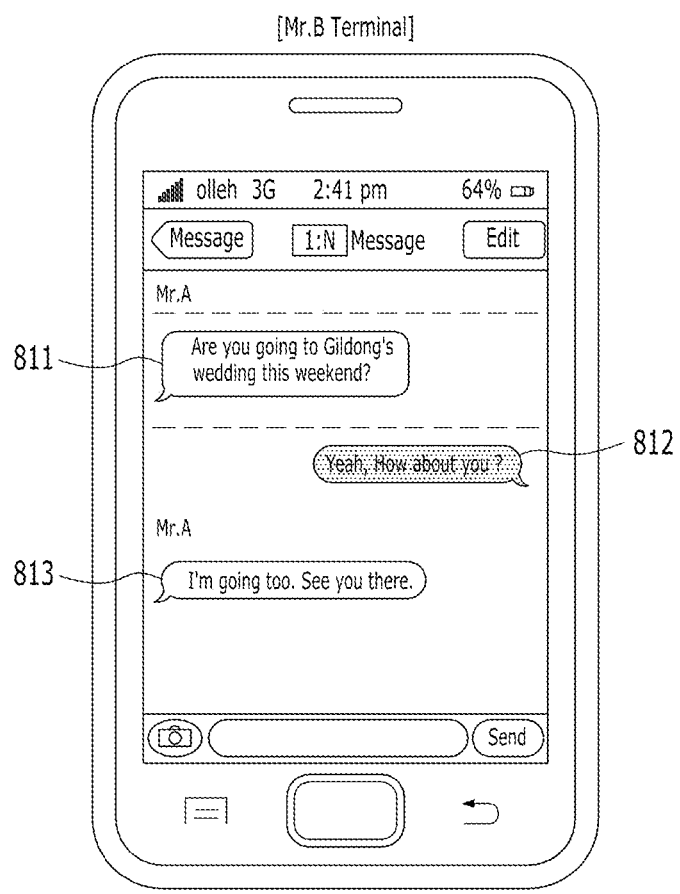
Figure 8C:
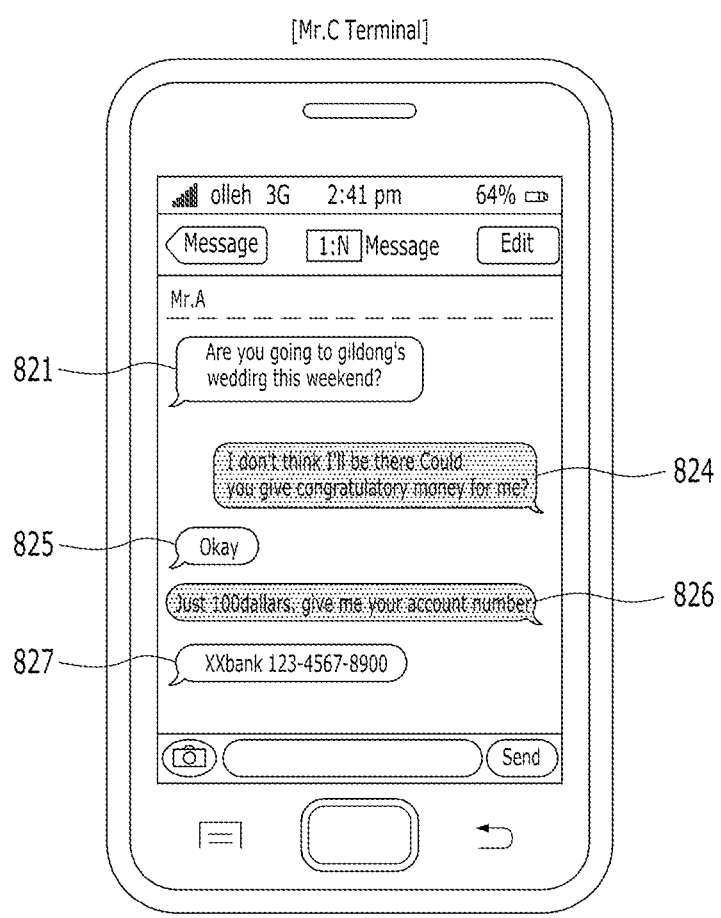

FIGS. 8A to 8C illustrate an exemplary user interface (UI) displaying 1:N messages in a user terminal in accordance with at least one embodiment of the present invention. FIG. 8A shows a user interface (UI) in a sender (A) terminal which sent message 801 using a 1:N message transmission technique. FIG. 8B shows a user interface (UI) in a recipient terminal of a recipient B and FIG. 8C shows a UI in a recipient terminal of a recipient C.

For example, a sender terminal of a server A sends message 801 "Are you going to Gildong's wedding this weekend?" including a tag (hereinafter, "a first tag") to a plurality of recipients B and C using a 1:N message transmission technique. Herein, the first tag inserted in sent message 801 may include a message type field, a message ID field, and/or a recipient ID field.

Each of the recipients B and C replies to the sender A. Specifically, each of recipient terminals may extract a tag (hereinafter, "a second tag") from the corresponding received messages 811 and 821, create reply message 812 or 824 including a tag (hereinafter, "a third tag"), and send the created reply message to the sender terminal. For example, a message ID field of the third tag may be the same value as that of the second tag.

Thereafter, reply messages 802-807, 812, 813, and 824-827 may be transmitted between the sender terminal and each of the recipient (B and C) terminals by a 1:1 message transmission technique. Especially, with respect to a message ID field, each of reply messages 812, 824, and 826 of recipients B and C may have the same value as that of a associated previously received message. Unlikely, each of reply messages 803, 805, 807, 813, 825, and 827 of the sender A may have a different message ID field value from a associated previously received message 802, 804, 806, 812, 824, or 826.

Referring to FIG. 8A, all sent/received messages 801-807 between the sender A and each of the recipients B and C in connection with a new message 801 may be displayed on a single screen in the sender terminal. That is, even though reply messages 802-807 are transmitted between the sender (A) terminal and each of the recipient terminals, the sender terminal may show entire messaging history between the sender A and the recipients B and C on a single display screen.

Meanwhile, referring to FIG. 8B, sent/received messages 804-807 between the sender A and the recipient C may not be displayed in the recipient B's terminal. Also, referring to FIG. 8C, sent/received messages 802 and 803 between the sender A and the recipient B may not be displayed in the recipient C's terminal.

Figure 9:
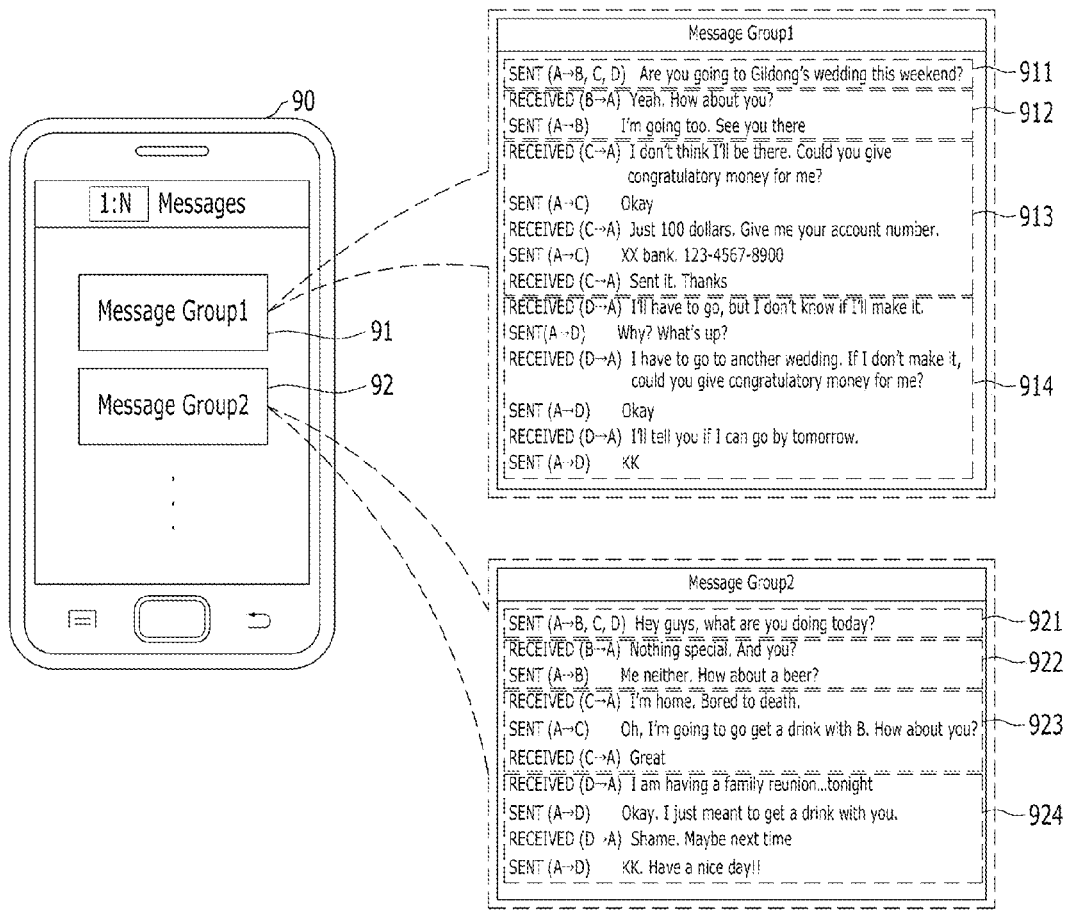
FIG. 9 illustrates a method for displaying grouped messages in a sender terminal in accordance with at least one embodiment of the present invention.

FIG. 9 illustrates a method for displaying grouped messages in a sender terminal in accordance with at least one embodiment of the present invention.

For example, sender terminal 90 may send message 911 (e.g., "Are you going to Gildong's wedding this weekend?") including a tag ("a first tag") to a plurality of recipients B, C, and D at the same time. That is, sender terminal 90 sends the identical message to multiple recipients B, C, and D using a 1:N message transmission technique.

Thereafter, each of the recipients B, C, and D may reply to the sender A. Specifically, recipient terminals of the recipients B, C, and D may extract the first tag from received message 911, create a reply message including a tag ("a second tag"), and send the created reply message to the sender terminal 90. Herein, the second tag may be identical to the first tag. Furthermore, reply messages 912-914 may be transmitted between sender terminal 90 and each of the recipient terminals by a 1:1 message transmission technique.

Meanwhile, sender terminal 90 may send new message 921 (e.g., "Hey guys, what are you doing today?") to a plurality of recipients B, C, and D at the same time. Herein, new messages 911 and 921 have a different message subject (i.e., a different event). Also, new message 921 includes a different tag value from the new message 911. Reply messages 922-924 may be transmitted between the sender terminal 90 and each of the recipient terminals by 1:1 message transmission technique.

The sender terminal 90 may group sent/received messages 911-914 and 921-924 into message groups (e.g., Message Group 1 and Message Group 2) based on attached tags. For example, all messages 912-914 associated with the message 911 may be classified into message group 1 (91), and all messages 922-924 associated with the message 921 may be classified into message group 2 (92).

Furthermore, sender terminal 90 may classify the messages belonging to each of the message groups into message sub-groups based on messaging counterpart identification information (e.g., a telephone number, a user identifier, an email address, and a recipient identifier included in a tag). In case of Message Group 1 (91), the messages belonging to Group 1 may be classified into a plurality of sub-groups 912-914. Herein, sub-group 912 includes sent/received messages between the sender A and the recipient B. Sub-group 913 includes sent/received messages between the sender A and the recipient C. Sub-group 914 includes sent/received messages between the sender A and the recipient D. Similarly, in case of Message Group 2 (92), the messages belonging to Message Group 2 may be classified into a plurality of sub-groups 922-924.

Accordingly, in case of Message Group 1 (91), even though reply messages 912-914 are transmitted between sender terminal 90 and each of the recipient terminals, sender terminal 90 may show a history of exchanging entire messages between the sender A and the recipients B, C, and D on a single display screen.

Also, sender terminal 90 may arrange and display sent/received messages based on sending/receiving time in each of sub-groups. For example, sender (A) terminal 90 may arrange and display six messages belonging to sub-group 914 based on sending/receiving times.

Sender terminal 90 may display messages in "a message group view" and "a sub-group message view." For example, sender terminal 90 may display sent/received messages as a list of groups (e.g., Message Groups 91 and 92). Sender terminal 90 may display only a representative message by group on a screen, and therefore other messages of a corresponding message group may not be displayed until a user input for displaying them is received. The representative message may be the latest message or the earliest message in a corresponding message group (e.g., in case of Group 1, "Are you going to Gildong's wedding this weekend?"). When the user further selects the recipient message view, the sender terminal 90 may display corresponding sub-groups (e.g., sub-groups 911-914 or sub-groups 921-924). For example, the user's selection may be made by touching a corresponding screen region or pressing a menu button.

Similarly, sender terminal 90 may display only a corresponding representative message by sub-group. The representative message in a sub-group may be the latest message or the earliest message in the sub-group. For example, in case of sub-group 913, only the latest message (e.g., "Sent it. Thanks.") may be displayed and the other messages may not be displayed until a user input for displaying them is received.

Figure 10:
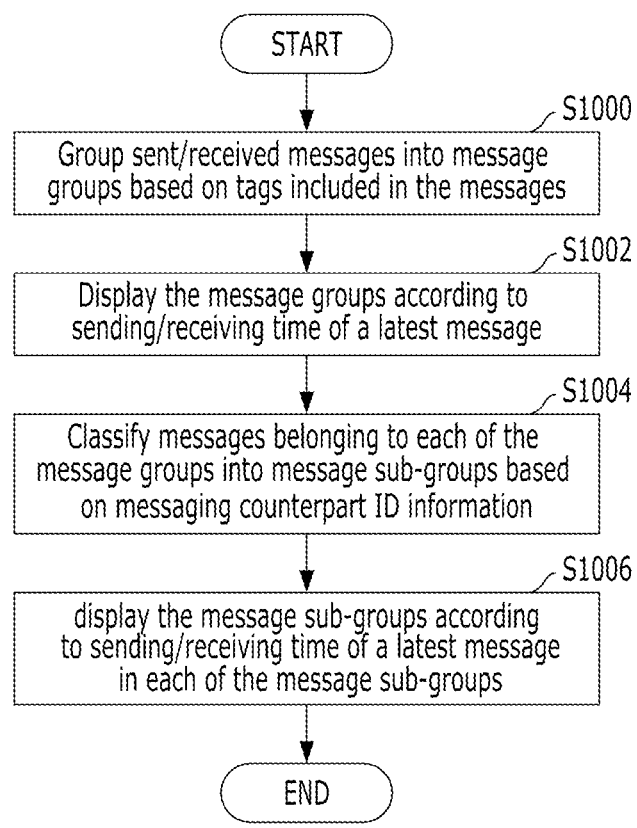
FIG. 10 illustrates a method for grouping and displaying messages based on tags according to at least one embodiment of the present invention.

FIG. 10 illustrates a method for grouping and displaying messages based on tags according to at least one embodiment of the present invention.

Referring to FIG. 10, a user terminal may group sent/received messages into message groups based on tags included in the messages at step S1000.

At step S1002, the user terminal may arrange and display the message groups according to sending/receiving time of a latest message in each of the message groups. In some embodiments, a message group having the latest message may be displayed on the uppermost screen region. Furthermore, the user terminal may display only the latest message or the earliest message (e.g., "Are you going to Gildong's wedding this weekend?" or "Hey guys, what are you doing today?" in FIG. 7) on a screen by each group.

At step S1004, the user terminal may classify the messages belonging to each of the message groups into message sub-groups based on messaging counterpart identification information. Herein, when a user terminal sends a message, a recipient may be a counterpart. When a user terminal receives a message, a sender may be a counterpart. The messaging counterpart identification information may be information identifying a counterpart, such as a telephone number, a user identifier, and an email address.

In some embodiments, if recipient identifiers are included in tags of sent/received messages, the user terminal may classify the messages belonging to each of the message groups into message sub-groups based on the recipient identifiers.

At step S1006, the user terminal may arrange and display the message sub-groups according to sending/receiving time of a latest message in each of the message sub-groups. In some embodiments, when a user selects a message group to be displayed, the user terminal may display sub-groups belonging to the selected message group. Furthermore, the user terminal may arrange and display sent/received messages based on sending/receiving time in each of sub-groups.

As described above, according to at least one embodiment of the present invention, it is possible to increase readability and efficiency in reading and managing messages by grouping messages based on tags.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bit stream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for grouping and displaying messages exchanged between a sender and multiple recipients in a sender terminal, the method comprising:
   sending, by the sender terminal, a first message including a first tag to a plurality of recipient terminals, wherein the first tag is created by the sender terminal;
   receiving, by the sender terminal, a second message from at least one of the recipient terminals, wherein the second message includes a second tag which is created by a corresponding recipient terminal;
   grouping, by the sender terminal, the received second message into a related message group based on the first tag and the second tag, wherein (i) each of the first tag and the second tag includes a message identification (ID) for a message grouping, and (ii) a message ID of the second tag is generated by appending a predetermined additional tag value to a message ID of the first tag according to a sequential tag addition scheme; and
   displaying, by the sender terminal, the received second messages within the related message group.

2. The method of claim 1, wherein the sending a first message includes:
   receiving information on a message type and at least one recipient to send the first message through a provided user interface;
   creating the first tag including information on at least one of a message type, the message identification (ID), and a message recipient based on the received information;
   receiving a message body from a sender of the sender terminal through a provided user interface;
   generating the first message by combining the created tag and the received message body; and
   simultaneously sending the generated first message to the plurality of recipients.

3. The method of claim 1, wherein the grouping the received second message includes:
   extracting the second tag from the received second message;
   determining the message ID of the second tag based on a value included in a message ID field;
   determining a recipient that transmits the second message; and
   finding the related message group that includes messages exchanged with the sender terminal and the determined recipient based on a message having the determined message ID.

4. The method of claim 3, wherein the displaying the received second message includes:
   providing, on a display unit of the sender terminal, a sender side graphic user interface (GUI) for displaying messages exchanged with the plurality of recipient terminals, wherein the sender side GUI is divided into a plurality of sections by each one of the plurality of recipients; and
   displaying the received second message within a section assigned to the found message group related to the received second message.

5. The method of claim 4, wherein the displaying the received second message within a section includes:
   displaying the received second message in connection with the first message having the message ID associated with the determined message ID of the received second message; and
   displaying the received second message based on a receiving time of the received second message.

6. The method of claim 1, further comprising:
   sending, by the sender terminal, a third message including a third tag in response to the second message to each recipient terminal that sent the second message,
   wherein the third message is sent from the sender terminal to each recipient terminal by a 1:1 message transmission technique.

7. The method of claim 6, wherein the sending a third message includes:
   creating the third tag having a message ID different from the message ID of the second message.

8. The method of claim 7, wherein the message ID of the third tag has at least one of a value increasing from a value of the message ID of the second tag and a value generated by the sequential tag addition scheme based on the second tag.

9. The method of claim 6, further comprising:
   displaying, by the sender terminal, the sent third message in connection with the displayed second message.

10. The method of claim 1, wherein the related message group is one of message groups classified by a recipient.

11. A method for grouping and displaying messages exchanged between a sender and multiple recipients in a recipient terminal, the method comprising:
   receiving, by the recipient terminal, a first message including a first tag from a sender terminal, wherein the first tag is created by the sender terminal;
   sending, by the recipient terminal, a second message including a second tag created based on the first tag in response to the first message when the received first message is a 1:N message based on the first tag, wherein the second tag is created by the recipient terminal; and displaying, by the recipient terminal, the sent second message in connection with the first message, wherein (i) each of the first tag and the second tag includes a message identification (ID) for a message grouping, and (ii) a message ID of the second tag is generated by appending a predetermined additional tag value to a message ID of the first tag according to a sequential tag addition scheme.

12. The method of claim 11, wherein the sending a second message includes:

extracting the first tag from the received first message;

creating the second tag based on the first tag in the first message;

receiving a reply message body from a user of the recipient terminal through a provided user interface;

generating a second message as a reply message to the first message by combining the second tag and the reply message body; and sending the second message to the sender terminal, wherein the second message is sent from the recipient terminal to the sender terminal by a 1:1 message transmission technique.

13. The method of claim 11, further comprising:

receiving, by the recipient terminal, a third message including a third tag in response to the second message from the sender terminal; and displaying, by the recipient terminal, the received third message in connection with the second message on the recipient terminal.

14. An apparatus for grouping and displaying messages exchanged between a sender and multiple recipients, the apparatus comprising:

a sending unit configured to send a first message including a first tag to a plurality of recipient terminals, wherein the first tag is created by the sending unit;

a receiving unit configured to receive a second message from at least one of the recipient terminals in response to the first message, wherein the second message includes a second tag which is created by a corresponding recipient terminal; and a display unit configured to group the received second message into a related message group based on the first tag and the second tag, wherein (i) each of the first tag and the second tag includes a message identification (ID) for a message grouping, and (ii) a message ID of the second tag is generated by appending a predetermined additional tag value to a message ID of the first tag according to a sequential tag addition scheme.

15. The apparatus of claim 14, wherein:

the receiving unit is configured to extract the second tag from the received second message; and the display unit is configured to determine the message ID of the second tag based on a value included in a message ID field, determine a recipient that transmits the second message, and find the related message group that includes messages exchanged with the sender terminal and the determined recipient based on a message having the determined message ID.

16. The apparatus of claim 15, wherein the display unit is configured to:

display a sender side graphic user interface (GUI) for displaying messages exchanged with the plurality of recipient terminals, wherein the sender side GUI is divided into a plurality of sections by each one of the plurality of recipients; and display the received second message within a section assigned to the found message group related to the received second message.

17. The method of claim 1, wherein the second message is transmitted from each recipient terminal to the sender terminal by a 1:1 message transmission technique.

18. The apparatus of claim 14, wherein the sending unit is configured to simultaneously send the first message to a plurality of recipient terminals.

19. The apparatus of claim 14, wherein the second message is transmitted from each recipient terminal to the sender terminal by a 1:1 message transmission technique.

* * * * *